United States Patent
Wang et al.

(10) Patent No.: US 10,992,145 B2
(45) Date of Patent: Apr. 27, 2021

(54) SYSTEM AND METHOD FOR BATTERY CELL BALANCING

(71) Applicant: Ford Global Technologies, LLC, Dearborn, MI (US)

(72) Inventors: Rui Wang, Canton, MI (US); Xu Wang, Northville, MI (US); Patterson Kaduvinal Abraham, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 405 days.

(21) Appl. No.: 16/021,420

(22) Filed: Jun. 28, 2018

(65) Prior Publication Data

US 2020/0006958 A1    Jan. 2, 2020

(51) Int. Cl.
*H02J 7/00* (2006.01)
*B60Q 9/00* (2006.01)
*B60L 58/20* (2019.01)

(52) U.S. Cl.
CPC ............ *H02J 7/0016* (2013.01); *B60L 58/20* (2019.02); *B60Q 9/00* (2013.01); *H02J 7/0021* (2013.01)

(58) Field of Classification Search
None
See application file for complete search history.

(56) References Cited

U.S. PATENT DOCUMENTS

| | | |
|---|---|---|
| 7,880,433 B2 | 2/2011 | Oh et al. |
| 9,209,630 B2 | 12/2015 | Naghshtabrizi et al. |
| 2011/0181246 A1* | 7/2011 | Tae ........................ H02J 7/0014 320/118 |
| 2017/0219657 A1* | 8/2017 | Vovos .................... B60L 58/21 |

* cited by examiner

*Primary Examiner* — Robert Grant
(74) *Attorney, Agent, or Firm* — David B Kelley; Brooks Kushman PC

(57) ABSTRACT

A system comprises a processor, configured to perform balancing on a commanded cell referring to a reference cell, and responsive to detecting balancing time exceeding a threshold time and state of charge (SOC) difference being above a tolerance, abort the balancing, and generate an error message. The threshold time depends on an average balancing time calculated using the SOC difference, a predetermined commanded cell capacity, and a predetermined balancing current.

17 Claims, 3 Drawing Sheets

SYSTEM AND METHOD FOR BATTERY CELL BALANCING

TECHNICAL FIELD

The present disclosure is generally related to battery cell balancing. More specifically, the present disclosure is related to a method and system of battery cell balancing for a vehicle.

BACKGROUND

In the automotive industry, electric-powered vehicles require large capacity batteries to supply power to propel the vehicle. Such large capacity batteries usually contain multiple cells connected in series and/or parallel. Although each battery cell may be designed in the same way to create the same capacity and performance, each actual cell may have different characteristics due to factors such as manufacturing variances, assembly variances, different charge/discharge histories, different using conditions (e.g. temperatures), and etc. To maximize the capacity and increase the longevity of the battery cells, cell balancing needs to be performed.

SUMMARY

In one or more illustrative embodiments, a system includes a processor configured to perform balancing on a commanded cell, and responsive to detecting a state of charge (SOC) difference between the commanded cell and a reference cell greater than a tolerance and a balancing time exceeding a threshold time that depends on the SOC difference, a predetermined commanded cell capacity, and a predetermined balancing current, abort the balancing and generate an error message.

In one or more illustrative embodiments, a battery system includes a processor, configured to responsive to detecting a SOC difference between two cells exceeding a tolerance, calculate an average balancing time using the SOC difference, a predetermined cell capacity, and a predetermined balancing current; calculate a threshold time using the average balancing time; perform balancing on one of the two cells with higher SOC; and abort the balancing responsive to detecting a balancing time exceeding the threshold time.

In one or more illustrative embodiments, a method for cell balancing includes, during balancing of a commanded cell, stopping by a controller the balancing responsive to detecting a state of charge (SOC) difference between the commanded cell and a reference cell greater than a tolerance and a balancing time greater than a threshold time that depends on the SOC difference, a predetermined commanded cell capacity, and a predetermined balancing current.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a battery cell balancing system for vehicles. More specifically, the present disclosure proposes a system for detecting unusual cell balancing event to increase the robustness of the balancing process.

Figure 1:
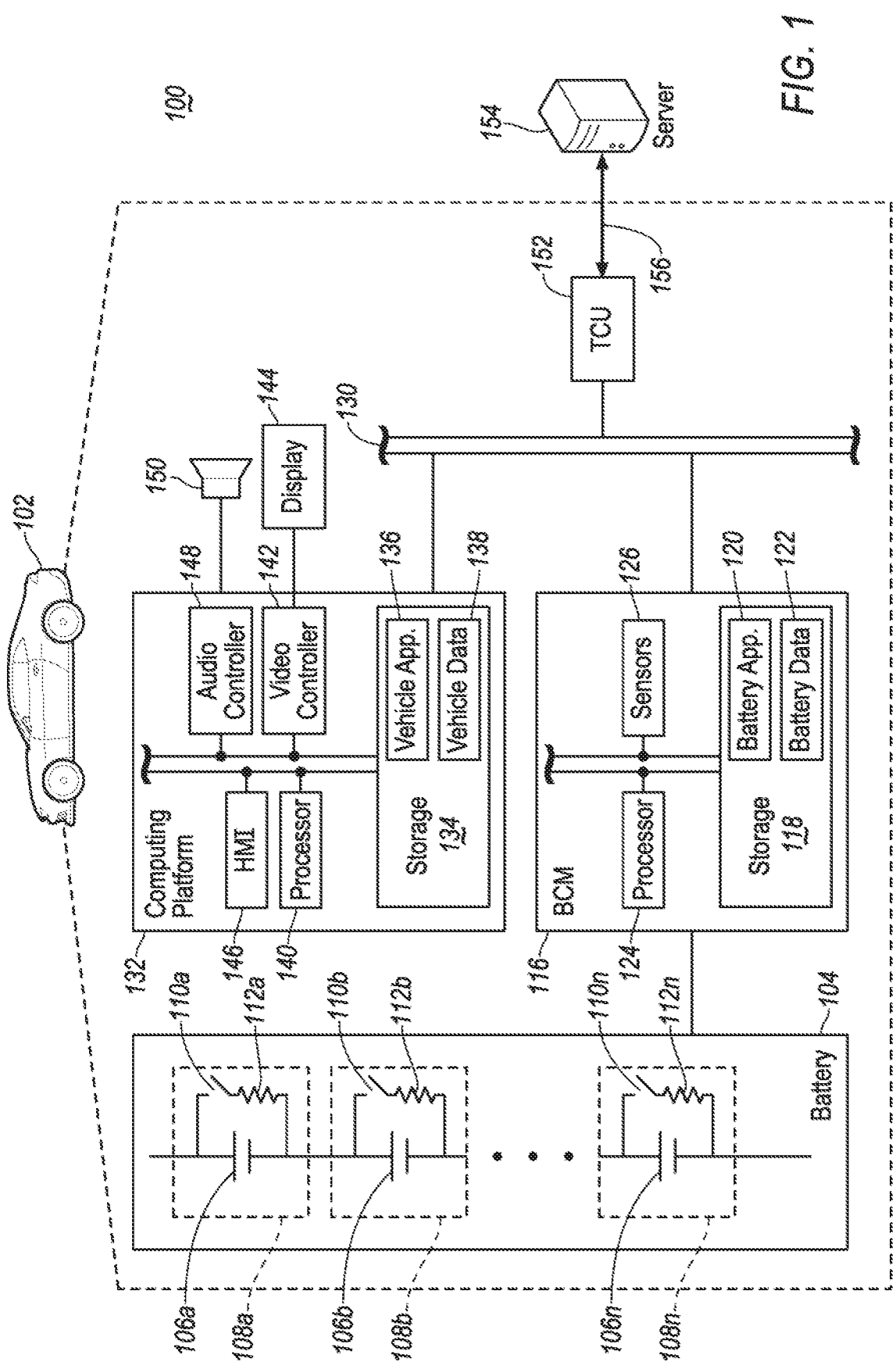
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may generally include a battery 104, a battery control module (BCM) 116, a computing platform 132, and a telematics control unit TCU 152. It should be noted that the illustrated system 100 is merely an example, and more, fewer, and/or differently located elements may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an electric motor. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the vehicle 102 may include the SYNC system manufactured by The Ford Motor Company of Dearborn, Mich.

As illustrated in FIG. 1, the vehicle 102 may be provided with a battery 104 configured to provide power/electricity for multiple purposes (e.g. propelling an electric motor). For instance, the battery 104 may be any type of rechargeable battery. As a few non-limiting examples, the battery 104 may be a lithium-ion battery, a Li-ion polymer battery and etc. The battery 104 may include multiple cells 106 connected in series and/or parallel. Referring to the example illustrated in FIG. 1, the battery 104 includes multiple cells 106*a*, 106*b*, . . . , 106*n* connected in series. Each cell 106 may be provided with a balancing circuit 108. The balancing circuit may include a switch 110 and a resistor 112 connected to the cell 106. When the switch 110 is closed, the connected cell 106 is discharged through its corresponding resistor 112 such that the battery 104 can be rebalanced. Although the cell balancing circuit 108 illustrated in FIG. 1 is generally a passive balancing circuit, it is noted that the disclosure is not limited thereto and active balancing circuits and other types of balancing circuit may be used and operated under the same principle disclosed in the present disclosure. In addition, each cell 106 as illustrated in FIG. 1 may be a single battery cell, or alternatively include more than one single cells connected in series and/or parallel and collectively referred to as a cell 106.

The battery 104 may be connected to a battery control module (BCM) 116 configured to monitor and control the operations of the battery 104. It is noted that the BCM 116 illustrated in FIG. 1 is merely an example. Structures and functions of the BCM may additionally or alternatively be integrated or combined with control circuits of the battery 104. As illustrated in FIG. 1, the BCM 116 of the vehicle 102 may include one or more sensors 126 configured to detect various data of the battery 104, such as voltage, state-of-charge (SOC), operating condition, and status of the discharge switch 110 of each cell 106 of the battery 104.

The BCM 116 may be further provided with one or more processors 124 configured to perform instructions, commands, and other routines in support of the processes described herein. For instance, the BCM 124 may be configured to execute instructions of battery applications 120 to provide features such as charging, discharging, balancing, processing diagnostic trouble codes (DTCs) and error report, hardware self-testing and communicating with other modules of the vehicle 102. Such instructions and other data may be maintained in a non-volatile manner using a variety of types of computer-readable storage medium 118. The computer-readable medium 118 (also referred to as a processor-readable medium or storage) includes any non-transitory medium (e.g., tangible medium) that participates in providing instructions or other data that may be read by the processor 124 of the BCM 116. Battery DTCs and other battery-related data may be stored and maintained in the storage 118 as battery data 122. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The BCM 116 may be further configured to communicate with a computing platform 132 via one or more in-vehicle network 130. The in-vehicle network 130 may include, but is not limited to, one or more of a controller area network (CAN), an Ethernet network, and a media oriented system transport (MOST), as some examples.

The computing platform 132 may include one or more processors 140 configured to perform instructions, commands, and other routines in support of the process described herein. For instance, the computing platform 132 may be configured to execute instructions of vehicle applications 136 to provide various features. Such instructions/applications 136 and other vehicle data 138 may be maintained in a non-volatile manner using a variety of types of computer-readable storage medium 134 (also referred to as a processor-readable medium or storage). In the example illustrated in FIG. 1, the computing platform 132 and the BCM 116 are separate modules. It is noted that the BCM 116 may be alternatively integrated with the computing platform 132 to perform substantially the same operations under the same principle of the present disclosure.

The computing platform 132 may be provided with various features allowing the vehicle occupants/users to interface with the vehicle 102. For example, the computing platform 132 may receive input from human-machine interface (HMI) controls 146 configured to provide for occupant interaction with the vehicle 102. As an example, the computing platform 132 may interface with one or more buttons (not shown) or other HMI controls configured to invoke functions on the computing platform 132 (e.g., steering wheel audio buttons, a push-to-talk button, instrument panel controls, etc.).

The computing platform 132 may also drive or otherwise communicate with one or more displays 144 configured to provide visual output to vehicle occupants by way of a video controller 142. In some cases, the display 144 may be a touch screen further configured to receive user touch input via the video controller 142, while in other cases the display 144 may be a display only, without touch input capabilities. The computing platform 132 may also drive or otherwise communicate with one or more speakers 150 configured to provide audio output to vehicle occupants by way of an audio controller 148.

The BCM 116 and computing platform 132 may be further configured to communicate with a telematics control unit (TCU) 152 via the in-vehicle network 130. The TCU 152 may be provided with hardware and software structures to enable communication between the vehicle 102 and a remote server 154 via a wireless connection 156 (e.g. a cellular network).

Figure 2:
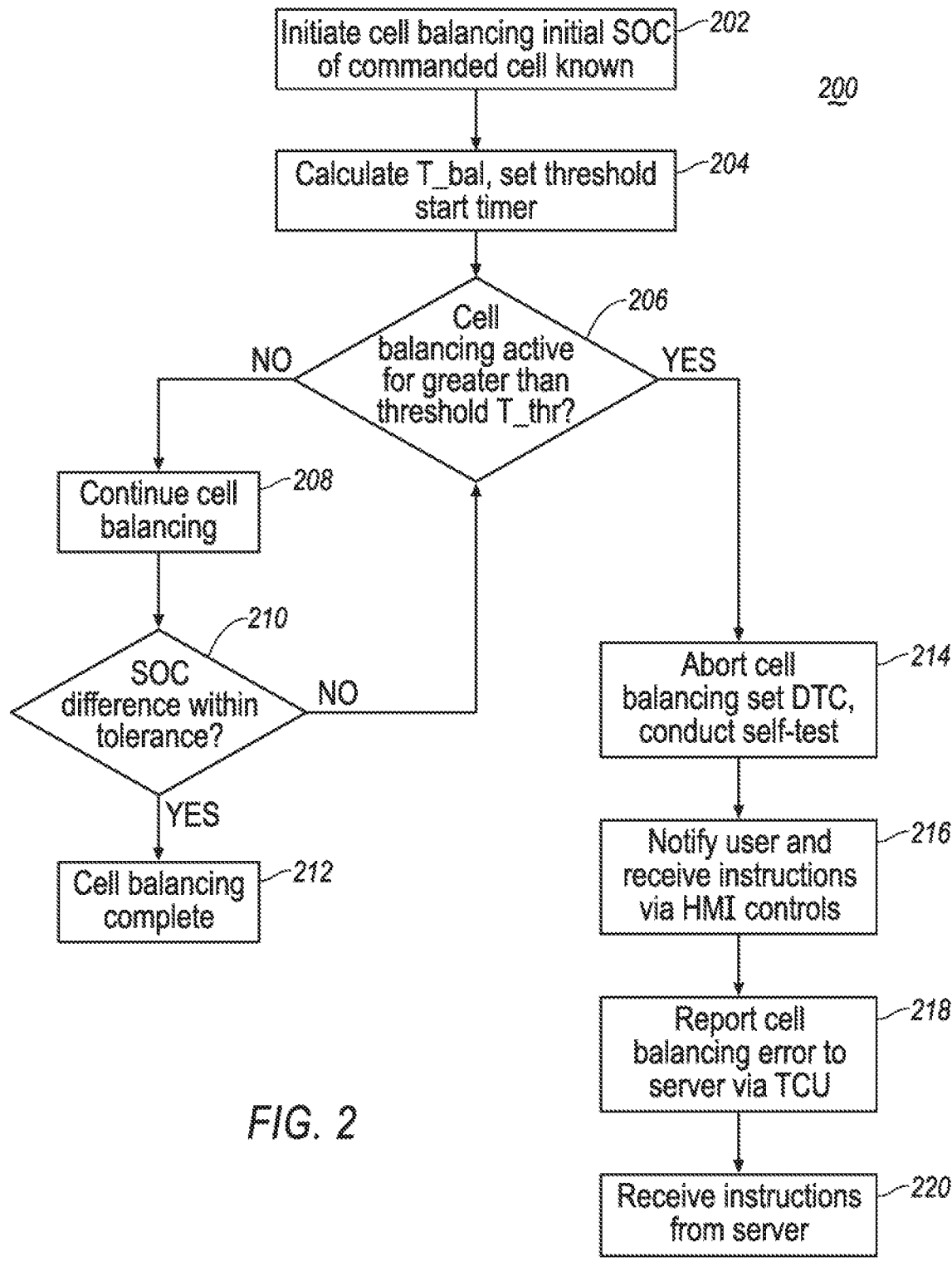
FIG. 2 illustrates an example flow diagram of a battery cell balancing process of one embodiment of the present disclosure.

Referring to FIG. 2, an example flow diagram 200 of a battery cell balancing process of one embodiment of the present disclosure is illustrated. At operation 202, the BCM 116 initiates cell balancing by closing the balancing switch 110 for the relevant cell 106 to be balanced. The initial SOC of the commanded cell is known. There are many ways to determine the SOC of each cell 106 of the battery 104. For instance, the BCM 116 may use the voltage of each cell 106 detected by the battery sensors 126 to determine the SOC of each cell 106.

At operation 204, the BCM 116 calculates an average balancing time T_bal, set a balancing time threshold, and starts a timer. The balancing time threshold may be calculated using the following formula:

$$T\_bal = \frac{\text{Difference in } SOC \times \text{Cell\_Capacity}}{\text{Cell Balancing Current}}$$

In the above formula, the Cell_Capacity represents the total capacity of the cell 106 to be balanced, which is referred to as a commanded cell; the Cell Balancing Current represents the current passing through the balancing circuit 108 of the commanded cell when the balancing switch 110 is closed. Both of the Cell_Capacity and the Cell Balancing Current may be predetermined by the BCM 116. The Difference in SOC represents the SOC difference between the commanded cell (cell to be balanced) and a reference cell. In general, the commanded cell has a higher SOC than the reference cell. In some examples, the reference cell is the cell having the lowest SOC in the battery 104. The SOC as well as the difference in SOC may be presented using percentile. For instance, if the SOC of the commanded cell is 80% and the SOC of the reference cell is 60%, the Difference in SOC will be 20% (i.e. 80%–60%). Alternatively, the SOC may be presented using units of electric charge, such as milliamp hour (mAh), amp hour (Ah) and etc.

The balancing time threshold T_thr may be set using the average balancing time T_bal obtained using the formula presented above. As an example, the threshold may be set to T_thr=2*T_bal. The general principle is the cell balancing operation should not be performed beyond the threshold time period T_thr. If the commanded cell is still being balanced after a calibratable threshold time period T_thr which is 2*T_bal in this example, it indicates there may be an issue/failure in the system and the balancing should be stopped. The threshold of 2*T_bal used here is merely an example and other values may be used.

At operation 206, the BCM 116 determines whether the cell balancing has been active for longer than the threshold T_thr time period by checking the timer. If the time does not exceed the threshold T_thr, the process proceeds to operation 208 and the BCM 116 continues to perform the cell balancing. At operation 210, the BCM 116 checks whether the difference in SOC has become within a tolerance from the SOC of the reference cell. For instance, the tolerance may be set to 5% of the cell capacity. If the SOC of the reference cell is 60%, any SOC between 55% and 65% is deemed as within the tolerance. Alternatively, a variable tolerance depending on the SOC of the reference cell may be used. As an example, a tolerance of 5% may be used when the SOC of the reference cell is more than 50%; and a tolerance of 3% may be used when the SOC of the reference cell is equal to or less than 50%. If the result for operation 210 is a no, the process returns to operation 206. Otherwise, the process proceeds to operation 212 to complete the cell balancing.

If at operation 206, the BCM 116 determines that the cell balancing has been active for longer than a threshold time period T_thr, the process proceeds to operation 214. At operation 214, the BCM 116 aborts the cell balancing. In addition, the BCM 116 may set a DTC, conduct a hardware self-test and reset a SOC open circuit voltage (OCV). The BCM 116 may be further configured to not resume or conduct further cell balancing until the next time SOC OCV reset has been completed and/or no hardware failure is present.

At operation 216, the BCM 116 notifies the user of the vehicle 102 about the cell balancing event via the HMI controls 146 of the computing platform 132. For instance, the BCM 116 may generate and send an error message to the computing platform 132 via the in-vehicle network 130. In response, the computing platform 132 may output the error message via the display 144 and/or the speaker 150 to notify the vehicle user. As an example, the error message may include a text alert such as "Battery error detected, please contact service department." The error message may also include an error code (e.g. the DTC) to facilitate the communication and diagnosis. The BCM 116 may be further configured to receive user instructions to perform actions. The user instructions may be offered along with the error message output via the HMI controls 146 for the user to choose from. As a few non-limiting examples, the user instructions may include: suspend cell balancing, conduct hardware self-test, generate error report/DTC and send to a remote technician, and etc.

At operation 218, the BCM 116 sends the error report/DTC to the remote server 154 via the TCU 152. The remote server 154 may include a single server computer or multiple computers accessible by a technician from the vehicle manufacturer for diagnosis purposes. At operation 220, the BCM 116 receives technician instructions from the server 154 via the TCU 152. The technician instructions may include more advance actions in addition to the user instructions, such as suspend all operation of the commanded cell at issue, ignore the error, and etc.

The operation of the process 200 may be applied to various situations. In one example, responsive to detecting the SOC difference between two or more cells 106 exceeds a preset tolerance, the BCM 116 initiates the cell balancing process by closing the switch 110 of the commanded cell. Since the capacity of the commanded cell and the balancing current is known, the BCM 116 may calculate the average balancing time T_bal, and further the threshold time T_thr using the T_bal (e.g. T_thr=2*T_bal). While performing the balancing, the BCM 116 continues to monitor the SOC of the cells 106. If the difference in SOC between the commanded cell and the reference cell reduces to within the tolerance within the threshold time T_thr, the balancing process 200 completes. Otherwise, if the process exceeds the threshold time T_thr and difference in SOC is still more than the tolerance, the BCM 116 aborts the process and generates a DTC and/or a report. In addition, the BCM 116 may output the report to the user via the HMI controls 146. Additionally or alternatively, the BCM 116 may send the report to the remote server 154 via the TCU 152 for diagnosis by technicians. Responsive to instructions from the user and/or technicians, the BCM 116 may perform actions such as self-test and OCV reset to prevent further damages to the battery 104.

Figure 3:
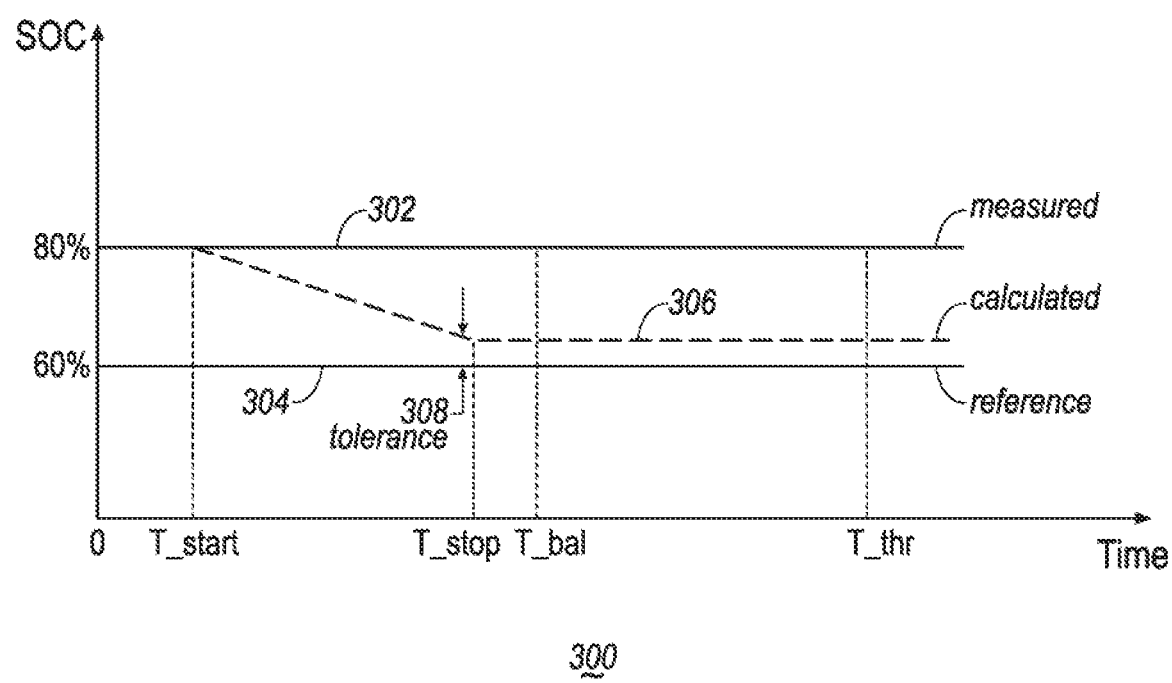
FIG. 3 illustrates an example signal diagram of the battery cell balancing process of one embodiment of the present disclosure.

Referring to FIG. 3, an example signal diagram 300 for the cell balancing process of one embodiment of the present disclosure is illustrated. In this example, the commanded cell SOC 302 is around 80% and the reference cell SOC 304 is around 60% initially. The balancing process starts at T_start. The signal in dashed line 306 represents the calculated commanded cell SOC. As illustrated in FIG. 3, the calculated commanded cell SOC 306 should start to reduce from T_start until T_stop, which is around T_bal calculated by BCM 116, where the SOC 306 is within a tolerance 308 of the reference SOC 304. The BCM 116 may stop the balancing process at T_stop.

However, the actual measured SOC illustrated in solid line 302 for the commanded cell may be significantly different from what is calculated. As illustrated, the measured commanded cell SOC 302 remains substantially at around 80%. At the threshold time T_thr, the SOC 302 is still outside the tolerance 308 of the reference SOC 306. This suggests there may be a failure in the system. A few possible failure examples include: a faulty sensor 126, a faulty switch 110, a faulty resister 112, and software glitch. In this case, the BCM 116 aborts the balancing process at T_thr.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a processor configured to
   perform balancing on a commanded cell, and
   responsive to detecting a state of charge (SOC) difference between the commanded cell and a reference cell greater than a tolerance and detecting a balancing time exceeding a threshold time that depends on the SOC difference, a predetermined commanded cell capacity, and a predetermined balancing current, abort the balancing and generate an error message,
   suspend further balancing operations on the commanded cell until a SOC open circuit voltage (OCV) on the cell is reset, and
   reset the SOC OCV on the commanded cell.

2. The system of claim 1, wherein the processor is further configured to conduct a hardware self-test.

3. The system of claim 2, wherein the processor is further configured to suspend further balancing operations on the commanded cell until the hardware self-test is complete.

4. The system of claim 1, wherein the processor is further configured to output the error message to a vehicle user via a human-machine interface (HMI).

5. The system of claim 1, wherein the processor is further configured send the error message to a server via a telematics control unit (TCU).

6. The system of claim 5, wherein the processor is further configured to receive an instruction from the server via the TCU.

7. The system of claim 1, wherein the balancing is performed by closing a switch connecting the commanded cell to a discharge resistor.

8. The system of claim 1, wherein the threshold time is approximately equal to twice an average balancing time derived from the SOC difference, the predetermined commanded cell capacity, and the predetermined balancing current.

9. A battery system comprising:
   a processor configured to
   responsive to detecting a state of charge (SOC) difference between two cells exceeding a tolerance,
   calculate an average balancing time using the SOC difference, a predetermined cell capacity, and a predetermined balancing current,
   calculate a threshold time using the average balancing time,
   perform balancing on a commanded cell of the two cells with higher SOC, and
   abort the balancing responsive to detecting a balancing time exceeding the threshold time, and
   suspend further balancing operations on the commanded cell until a SOC open circuit voltage (OCV) on the commanded cell is reset.

10. The battery system of claim 9, wherein the processor is further configured to generate an error message and output the error message to a vehicle user via a human-machine interface (HMI) controls.

11. The battery system of claim 10, wherein the processor is further configured to receive a vehicle user instruction via the HMI controls.

12. The battery system of claim 9, wherein the processor is further configured generate an error message and send the error message to a server via a telematics control unit (TCU).

13. The battery system of claim 12, wherein the processor is further configured to receive an instruction from the server via the TCU.

14. The battery system of claim 9, wherein the processor is further configured to suspend further balancing operations until a hardware self-test is complete.

15. A method for cell balancing, comprising:
   during balancing of a commanded cell, stopping by a controller the balancing responsive to detecting a state of charge (SOC) difference between the commanded cell and a reference cell greater than a tolerance and detecting a balancing time greater than a threshold time that depends on the SOC difference, a predetermined commanded cell capacity, and a predetermined balancing current;
   generating an error message; and
   sending the error message to a server.

16. The method of claim 15, wherein the tolerance depends on a SOC of the reference cell.

17. The method of claim 15, further comprising:
   responsive to receiving an instruction from the server, execute the instruction.

* * * * *